United States Patent
Spillane

(10) Patent No.: US 7,609,932 B1
(45) Date of Patent: Oct. 27, 2009

(54) SLOT WAVEGUIDE STRUCTURE

(75) Inventor: Sean Spillane, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 691 days.

(21) Appl. No.: 11/481,687

(22) Filed: Jul. 6, 2006

(51) Int. Cl.
*G02B 6/10* (2006.01)
*H01L 21/00* (2006.01)

(52) U.S. Cl. .................. 385/132; 385/129; 385/130; 385/131; 385/141; 385/12; 385/1; 385/14; 438/31

(58) Field of Classification Search .............. 385/1, 385/2, 3, 14, 15, 31, 30, 42, 40, 12, 120, 385/130, 131, 132, 141; 65/385, 386, 393, 65/403; 438/31
See application file for complete search history.

(56) References Cited

U.S. PATENT DOCUMENTS

| 4,575,180 | A * | 3/1986 | Chang ................... 385/47 |
| 5,453,394 | A * | 9/1995 | Yonehara et al. ........... 438/455 |
| 5,846,842 | A * | 12/1998 | Herron et al. ............... 436/518 |
| 7,209,606 | B2 * | 4/2007 | Kersey et al. ............... 385/13 |
| 7,352,942 | B2 * | 4/2008 | Feng et al. ................. 385/130 |
| 7,424,192 | B2 * | 9/2008 | Hochberg et al. ........... 385/122 |
| 7,444,045 | B2 * | 10/2008 | Fan et al. .................... 385/27 |
| 7,471,866 | B2 * | 12/2008 | Dumais et al. .............. 385/132 |
| 7,474,811 | B1 * | 1/2009 | Quitoriano et al. ........... 385/2 |
| 7,546,017 | B2 * | 6/2009 | Siga et al. .................. 385/131 |
| 2009/0022445 | A1 * | 1/2009 | Hochberg et al. ............. 385/3 |

* cited by examiner

*Primary Examiner*—Brian M Healy

(57) ABSTRACT

A nanometer slot waveguide includes a nanometer slot waveguide structure with vertically stacked layers. The vertically stacked layers include a substrate, a first waveguide layer defining a first rail, a spacer layer defining a slot, and a second waveguide layer defining a second rail.

20 Claims, 8 Drawing Sheets

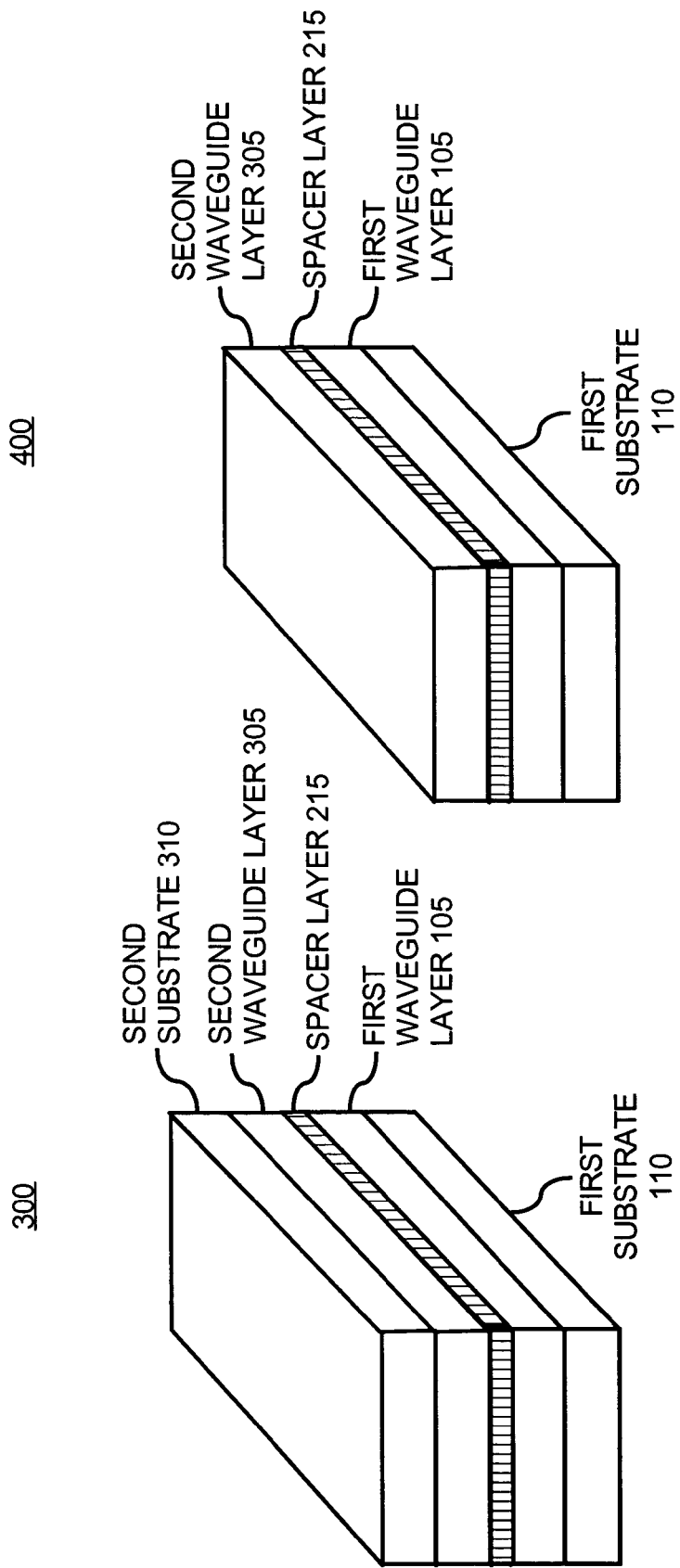

SLOT WAVEGUIDE STRUCTURE

BACKGROUND

A waveguide is a physical structure that guides the propagation of a wave. Waveguides may guide a variety of different types of waves, including electromagnetic waves. A slot waveguide is a waveguide formed by two closely spaced dielectric waveguides, such that for a wave polarized perpendicular to the slot the field maximum lies within the slot. Slot waveguides may be preferred over other waveguide types because slot waveguides may allow easier access to the optical field maximum at the center of the waveguide. In addition, slot waveguides allow stronger localization of the electric field inside the slot, or higher confinement, which is important for certain applications.

Fabrication of a slot waveguide is more difficult than the fabrication of conventional ridge waveguides. Slot waveguides are conventionally formed by cutting a narrow slot in a ridge waveguide. When a narrow slot is required, with widths of 20-100 nanometers (nm), a high resolution fabrication technique, such as electron-beam or nanoimprint (NI) lithography is used. The cutting process inherently produces rough sidewalls in the slot of the slot waveguide. The roughness in the sidewalls created in the vertical etching and lithographic processes causes wave propagation losses in the slot. A high degree of electric field localization is found at the vertically-etched sidewalls of conventional slot waveguides, which indicates that the propagation losses are greater than those of ridge waveguides, where the electric field localization is much lower. Experimental measurements have indicated losses in a Silicon-on-Insulator (SOI) slot waveguide of approximately 8 dB/cm, exceeding the <3 dB/cm values common to a SOI ridge waveguide. Moreover, conventional slot waveguides are expensive to produce because the high tolerances needed for accurate definition of the slot require etching and lithographic processes which are inherently difficult and costly.

BRIEF DESCRIPTION OF THE DRAWINGS

Various features of the embodiments can be more fully appreciated, as the same become better understood with reference to the following detailed description of the embodiments when considered in connection with the accompanying figures.

FIG. 3 illustrates another step in the fabrication of a slot waveguide, according to an embodiment;

FIG. 4 illustrates another step in the fabrication of a slot waveguide, according to an embodiment;

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

A method for fabricating slot waveguides and slot waveguide structures are disclosed. The fabricated slot waveguide includes two rails formed by waveguide layers and a slot in between the two rails. The slot may have a width of 20-100 nanometers and may have smoother sidewalls than the sidewalls found in conventional waveguides. The fabrication method allows for a reduced variance in slot width as compared to conventional etching methods used to form slot waveguides. For instance, the sidewalls of the slot, which are formed by the rails interfacing the slot, may vary the width of the slot by less than two nanometers, and in some applications, by less than one nanometer.

Figure 1:
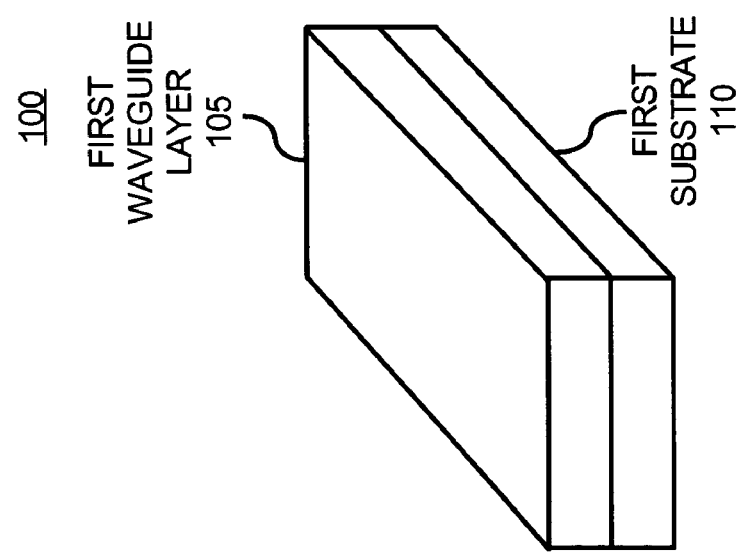
FIG. 1 illustrates a step in the fabrication of a slot waveguide, according to an embodiment.

FIG. 1 illustrates a first waveguide structure 100, according to an embodiment. The first waveguide structure 100 may include at least a first waveguide layer 105. The first waveguide structure 100 may also comprise a first substrate 110. The layers may be formed from any reasonably suitable materials, including a plurality of commercially available materials, such as, for example, silicon on insulator (SOI), $SiN/SiO_2$, or any dielectric pair with sufficient dielectric index contrast to create a slot waveguide. According to an embodiment, the first waveguide layer 105 has a refractive index greater than the refractive index of the first substrate layer 110. Refractive index of a material refers to the factor by which the phase velocity of electromagnetic radiation is slowed in that material, relative to its velocity in a vacuum. The greater refractive index of the first waveguide layer 105 increases the wave propagation ability of the nanometer slot waveguide. The first waveguide layer 105 may be comprised of silicon, but other materials may also be used. The first waveguide layer 105 may have a thickness ranging from about 200 micrometers to about 400 micrometers.

The first substrate layer 110 may comprise one or more layers. The first substrate layer 110 includes a material having a lower refractive index than the first waveguide layer 105, such as silica, or other materials. The first substrate layer may range from about one micrometer to above 400 micrometers.

Figure 2:
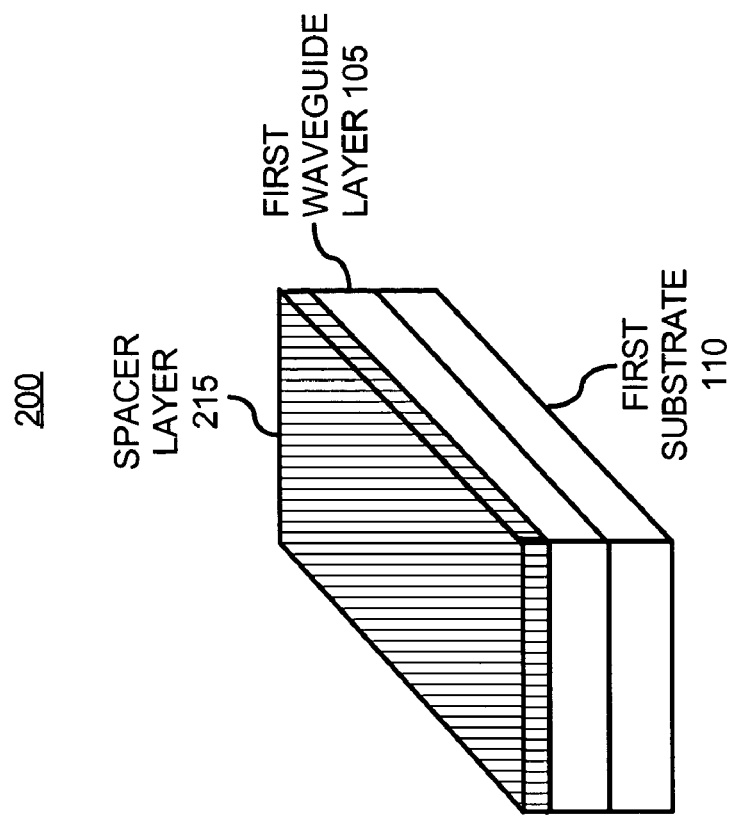
FIG. 2 illustrates another step in the fabrication of a slot waveguide, according to an embodiment.

FIG. 2 illustrates a structure 200, according to an embodiment, comprising the first waveguide structure 100 shown in FIG. 1 with a spacer layer 215 provided thereon. The spacer layer 215 may be provided on the first waveguide layer 105. The spacer layer 215 may have a thickness of less than or equal to 100 nanometers. The spacer layer 215 may comprise any reasonably suitable material. For example, an optically transparent material or low index dielectric medium, such as erbium-doped polymers, may be used. According to an embodiment, the spacer layer 215 has a refractive index lower than the waveguide layer 105.

The spacer layer 215 may be provided on the first waveguide structure 100 in a variety of different manners. For example, the spacer layer 215 may be bonded or directly extruded onto the first waveguide structure 100. Alternatively, the spacer layer 215 may be grown on the first waveguide structure 100 by, for example, chemical vapor deposition, such as (PECVD, LPCVD, etc.), atomic layer deposition, such as ALD, spin coating, epitaxy (MBE, etc.), or any other reasonably suitable technique.

FIG. 3 illustrates a structure 300, according to an embodiment, comprising the structure 200, illustrated in FIG. 2, with a second waveguide structure provided thereon. The second waveguide structure comprises a second waveguide layer 305 and a second substrate 310. In an embodiment, the second waveguide structure may be substantially similar to the first waveguide structure 100.

According to an embodiment, the first waveguide structure 100 may be obtained as a single multi-layer structure comprising the first waveguide layer 105 and the first substrate layer 110. The second waveguide structure may also be obtained as a single multi-layered structure comprising the second waveguide layer 305 and the second substrate 310. The second waveguide structure may be provided on the spacer layer 215 in an inverted fashion, such that the second waveguide layer 305 contacts the spacer layer 215. The second substrate layer 310 may later be removed to create an intermediate waveguide structure as described below, with respect to FIG. 4.

As described above, FIG. 3 illustrates the second waveguide structure, according to an embodiment, having a second waveguide layer 305 and a second substrate 310. However, this is merely an example for illustration purposes only, and the second waveguide structure may have a different configuration. For example, the second waveguide structure may comprise only a second waveguide layer 305 or the second waveguide structure may comprise more than two layers. For example, the second substrate 310 may include multiple layers. The second waveguide structure may be identical to or different than the first waveguide structure 100. The second waveguide layer 305 and the second substrate 310 may be identical to or different than the first waveguide layer 105 and the first substrate 110.

The second waveguide layer 305 may be provided on the spacer layer 215 in a variety of different manners. For example, the second waveguide layer 305 may be bonded to the spacer layer 215 in any reasonably suitable manner known in the art, such as fusion bonding. The spacer layer 215, itself, may act as a "glue" to hold the second waveguide layer 305 in place. The second waveguide layer 305 may also be grown on the spacer layer 215 by, for example, chemical vapor deposition, such as (PECVD, LPCVD, etc.), atomic layer deposition, such as ALD, spin coating, epitaxy (MBE, etc.), or any other reasonably suitable technique.

FIG. 4 illustrates an intermediate waveguide structure 400, according to an embodiment, comprising a first waveguide structure 100, a spacer layer 215, and a second waveguide layer 305. The intermediate waveguide structure 400 may be formed by removing the second substrate 310 from the structure 300 illustrated in FIG. 3. The second substrate 310 may be removed by any reasonably suitable technique, including etching, lithographic patterning, nanolithography, electron beam direct write lithography (EDBW), deep ultraviolet lithography, extreme ultraviolet lithography (EUV), next generation lithography (NGL), ion or electron projection lithography (PREVAIL, SCAPEL, LEEPL), nanoimprint lithography (NIL), step and flash imprint lithography (LISA, LADI), and scanning probe lithography (SPL).

In several examples it may be unnecessary to remove a second substrate layer 310 to create the intermediate waveguides structure 400. For instance, a second substrate 310 may not be bonded or applied to the spacer layer 215. In this example, only a second waveguide layer 305 is applied to the spacer layer 215. In another example, a second waveguide layer 305 may be grown on the spacer layer 215 through any reasonably suitable chemical vapor deposition process described above, thus rendering removal of a second substrate layer unnecessary.

Figure 5:
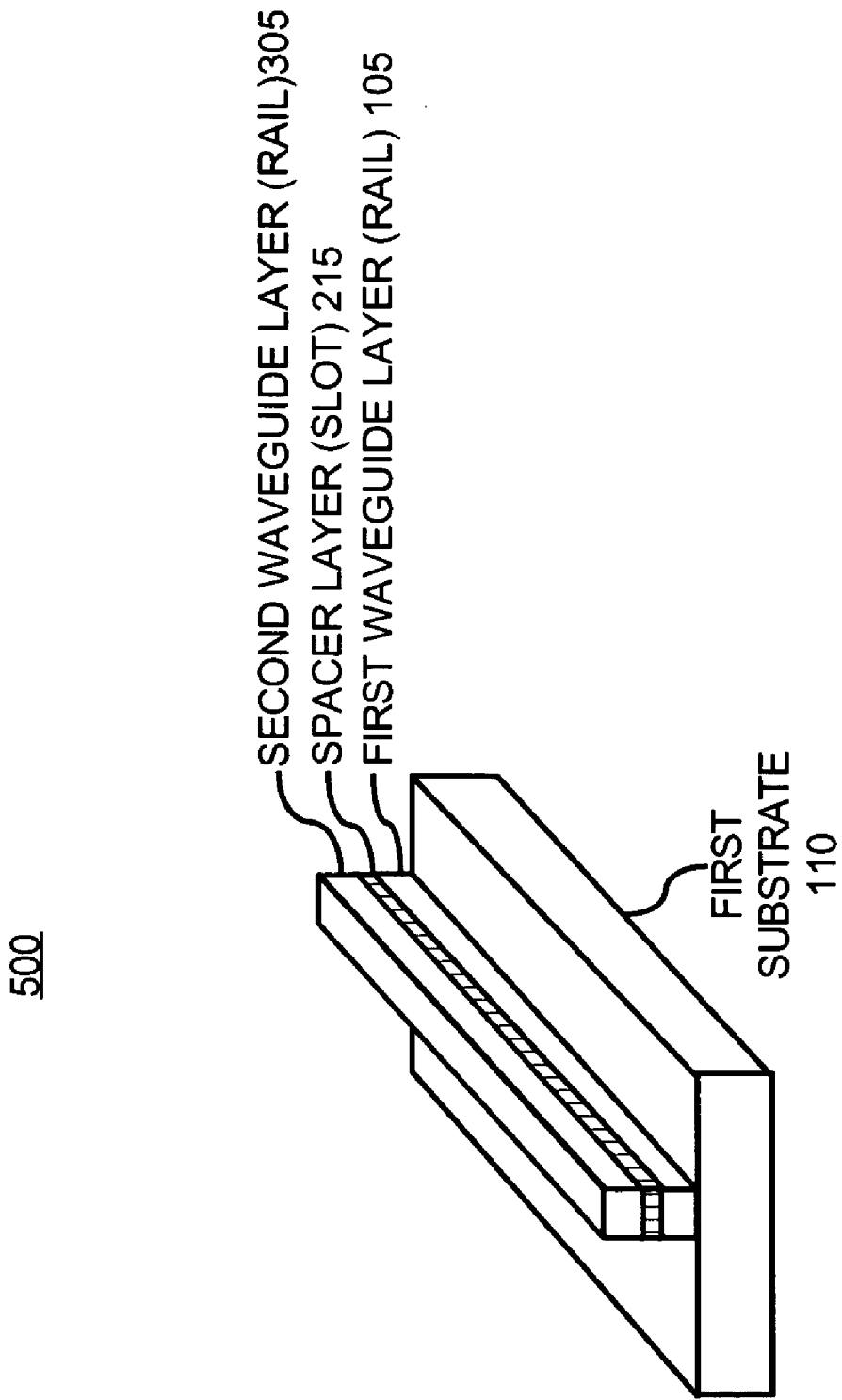
FIG. 5 illustrates another step in the fabrication of a slot waveguide, according to an embodiment.

FIG. 5 illustrates a nanometer slot waveguide 500, according to an embodiment, which includes the first substrate 110, a rail formed from the first waveguide layer 105, a slot formed by the spacer layer 215, and a second rail formed by the second waveguide layer 305. The slot waveguide structure 500 may be formed by using an etching or lithographic process to remove portions of the intermediate waveguide structure 400. Any reasonably suitable technique may be used to remove portions of the intermediate waveguide structure 400, including lithographic patterning, nanolithography, electron beam direct write lithography (EDBW), deep ultraviolet lithography, extreme ultraviolet lithography (EUV), next generation lithography (NGL), ion or electron projection lithography (PREVAIL, SCAPEL, LEEPL), focused ion beam lithography (FIB), nanoimprint lithography (NIL), step and flash imprint lithography (LISA, LADI), and scanning probe lithography (SPL).

The slot waveguide structure 500 is a nanometer slot waveguide comprising vertically stacked layers, including the first waveguide layer defining a rail, the second waveguide layer defining a rail, and the spacer layer defining a slot between the rails. The distance between the rails, or the width of the slot 215, may be less than about 100 nanometers or may be as large as a micron depending on the materials used to form the slot 215. The slot 215 has walls formed by the surface of the rail 305 facing the slot 215 and the surface of the rail 105 facing the slot 215. The walls may be substantially atomically flat because they are not subject to an etching or lithographic process in order to create the slot. Substantially atomically flat walls are walls having a surface roughness, which is less than, or smoother than, the surface roughness of walls of conventional slot waveguides created by etching processes. For example, the roughness of the surfaces of the rails 305, 105 interfacing the slot 215 and forming the walls of the slot 215 may vary the width of the slot 215 by less than two nanometers and in some cases by less than one nanometer. Thus, any change in the width of the slot 215 may be less than one nanometer, because of the flatness of the surfaces of the rails.

However, the width of the slot 215 may be altered through external means including thermal, pressure, vibration, electrical, stress, etc. For example, the slot waveguide structure 500 may be used in an application where it is desirable to narrow the width of the slot. In such an application, pressure, for example, may be exerted on the slot 215 to narrow its width. A change in the width of the slot 215 may be detected and translated into optical modulation, which may be measured. In such an application, the slot waveguide structure 500 may function as a sensor to detect the factors causing the change in the width of the slot.

The width of the slot 215 may also be intentionally altered in certain applications. In tuning element applications, for example, the width of the slot 215 may be modulated to change the effective index of the waveguide, thereby causing a phase-shift which may be used to filter or modulate an optical signal. The modulation may be driven through electrical, acoustic, or thermal means.

Figure 6:
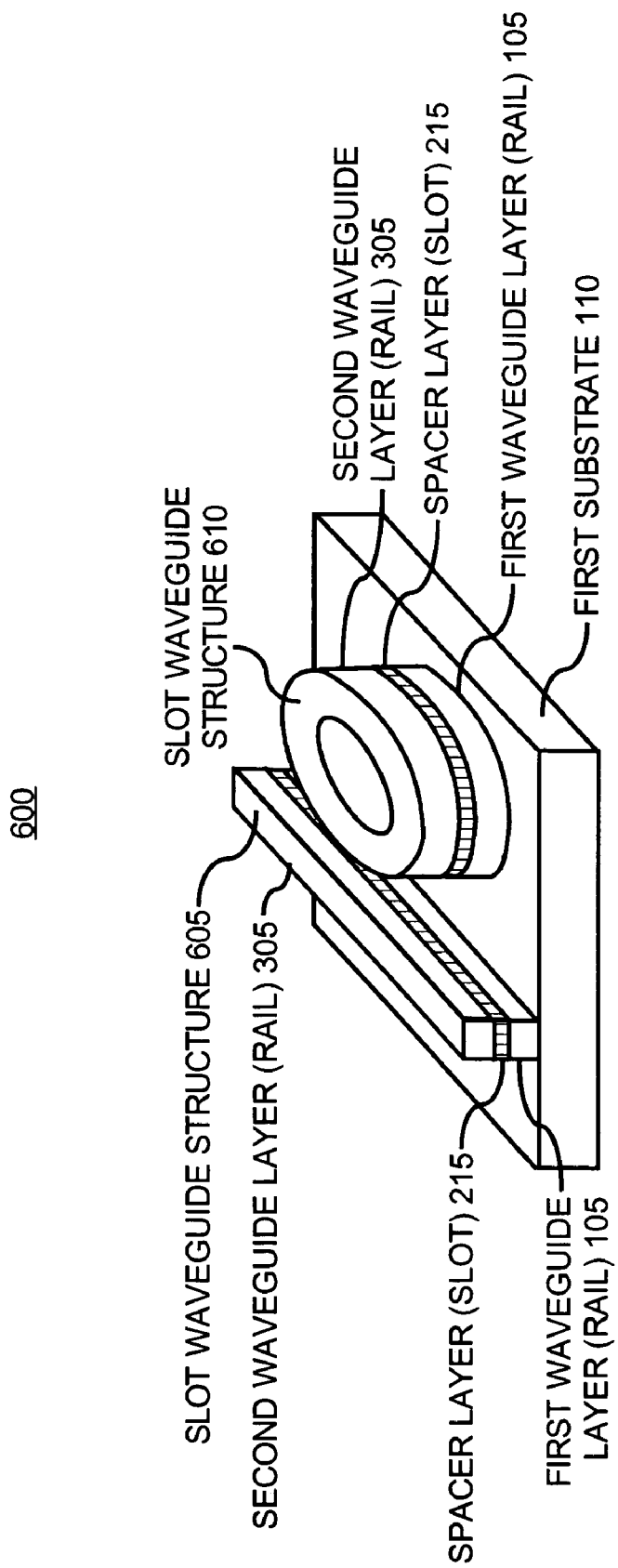
FIG. 6 illustrates structures of a slot waveguide, according to embodiments.

FIG. 6 illustrates a slot waveguide structure 600, according to an embodiment. The slot waveguide structure 600 includes the first substrate 110, the waveguide layer 105 forming a rail, the spacer layer 215 forming a slot and the second waveguide layer 305 forming a rail. In the slot waveguide structure 600, portions of the intermediate waveguide structure 400 may be selectively removed, using the methods described above, to create the slot waveguide structure 605 and the slot waveguide structure 610. As FIG. 6 illustrates, the slot waveguide structure 605 may be substantially linear and the slot waveguide structure 610 may be substantially circular or oval, depending on the desired application. FIG. 6 represents two examples of slot waveguide structures that may be created. However, there are many possible variations of the structures depicted in FIG. 6 and any reasonably suitable number of slot waveguide structures may be created from the intermediate waveguide structure 400, in any reasonably suitable shape, such as linear, circular, curvi-linear, etc. Portions of the intermediate slot waveguide 400 may also be removed to create cavity or micro-cavity configurations.

Figure 7:
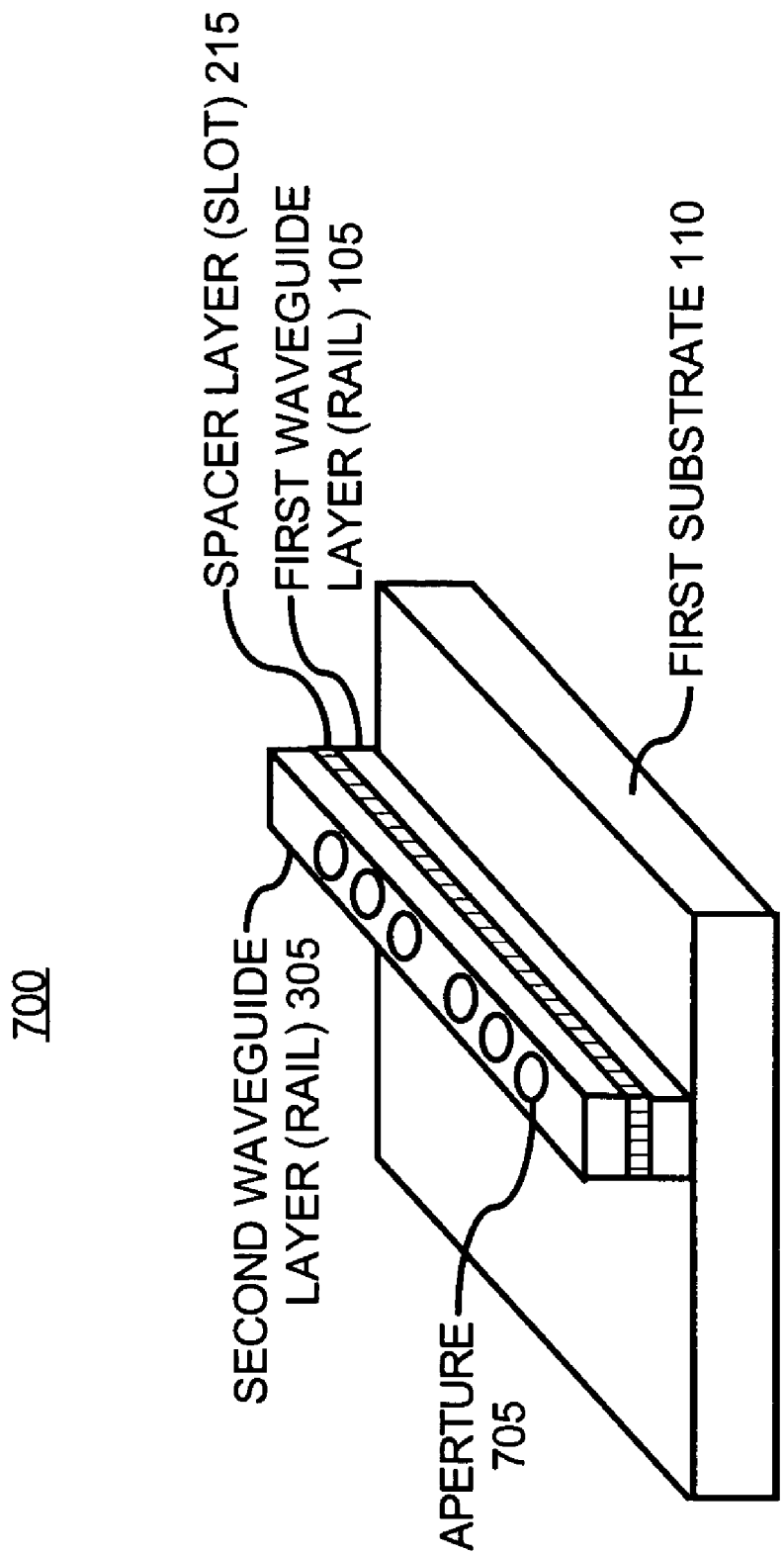
FIG. 7 illustrates another structure of a slot waveguide, according to an embodiment.

FIG. 7 illustrates a slot waveguide structure 700, according to another embodiment. The waveguide structure 700 may include the substrate 110, the waveguide layer 105 forming a rail, the spacer layer 215 forming a slot, and the waveguide layer 305 forming a rail. Portions of the waveguide layer 305 forming a rail may be selectively removed in any reasonably suitable configuration to form apertures 705. The removal of portions to create apertures 705 may also extend through the spacer layer 215 forming the slot, and through the waveguide layer 105 forming the rail. The apertures 705 may form microcavities, such as a photonic crystal cavity.

Slot waveguide structures may be subjected to a variety of additional processes. For instance, in one example, the spacer layer 215 forming a slot may be removed or portions thereof may be selectively removed. When the spacer layer 215 is removed it may create an empty slot in the slot waveguide structure. The slot 215 may be open such that the presence of materials, such as biological, chemical, biochemical, physical, etc, may enter the slot 215. The slot 215 may be monitored such that materials entering the slot may be detected. For example, the slot 215 may be monitored for a change in the dielectric index or optical absorption in the slot region, such that when a biochemical material, for example, enters the slot, the biochemical material alters the dielectric index or optical absorption in the slot. This change can be detected to monitor for the presence of materials.

Figure 8:
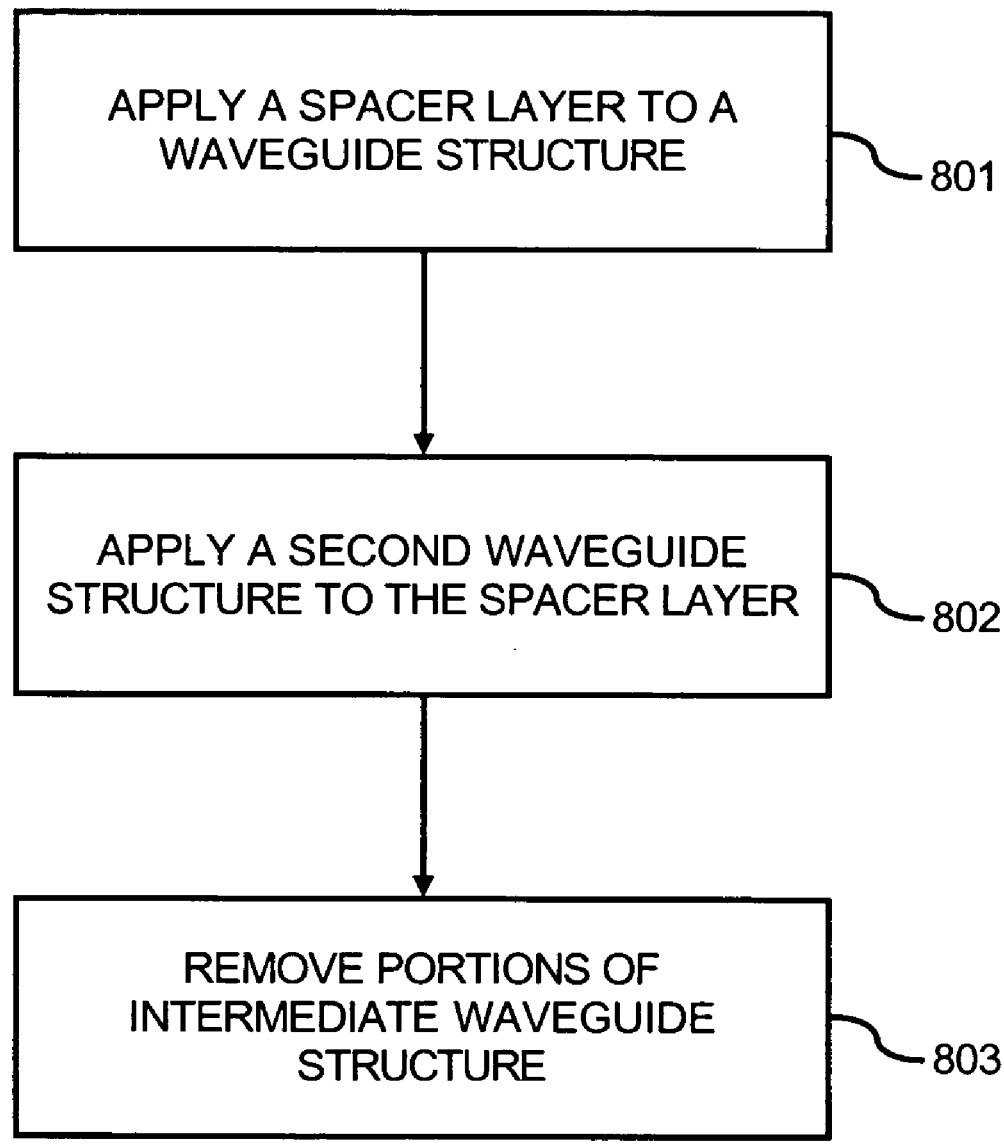
FIG. 8 illustrates a flow chart of a method, according to an embodiment.

FIG. 8 illustrates a method 800 of forming a slot waveguide structure, according to an embodiment. The method 800 is described with respect to FIGS. 1-7 by way of example and not limitation. At step 801, a spacer layer is applied to a waveguide structure. The waveguide structure of the method 800 may be the same as or similar to the waveguide structures described above and may include a waveguide layer and a substrate layer. The spacer layer may be the same as, or similar to the spacer layer 215, and may be applied in any of the manners described above.

At step 802, a second waveguide structure is applied to the spacer layer. The second waveguide structure may be similar to or the same as the first waveguide structure and may be applied in any of the manners described above. If the second waveguide structure includes a substrate layer, the substrate layer may be removed to form an intermediate waveguide structure.

At step 803, portions of the intermediate waveguide structure may be removed. Portions of the intermediate waveguide structure may be selectively removed by any of the methods described above. Removing portions of the intermediate waveguide structure may result in a nanometer slot waveguide structure, as described above.

Figure 9:
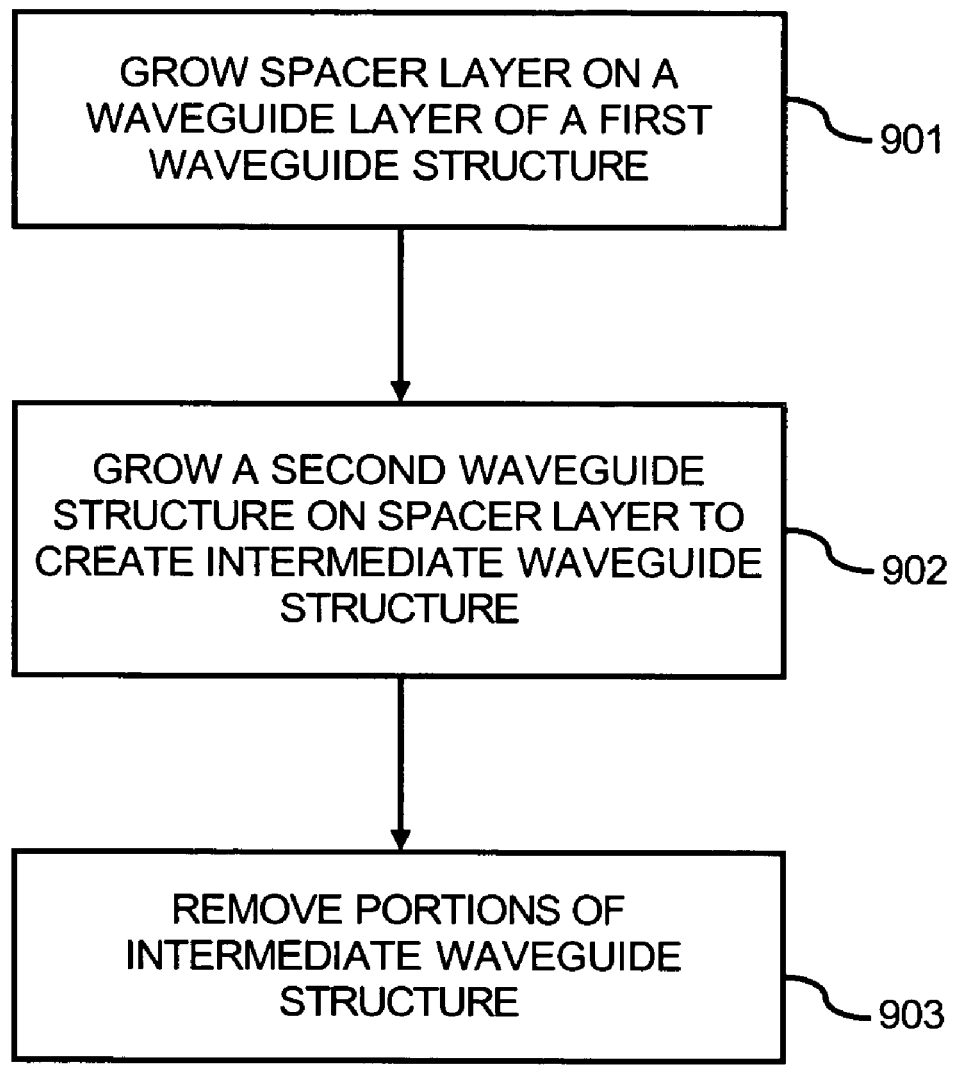
FIG. 9 illustrates a flow chart of a method, according to another embodiment.

FIG. 9 illustrates a method 900 of forming a slot waveguide structure, according to another example. At step 901, a spacer layer may be grown on a waveguide layer of a first waveguide structure. The waveguide structure may be the same as or similar to the waveguide structures described above and may include a waveguide layer and a substrate layer. The spacer layer may be the same as, or similar to the spacer layer 215, as described above.

At step 902, a second waveguide structure may be grown on the spacer layer to create an intermediate waveguide structure. The second waveguide structure may be similar to or the same as the first waveguide structure or may only include a waveguide layer.

At step 903, portions of the intermediate waveguide structure may be removed. Portions of the intermediate waveguide structure may be removed by any of the methods described above. Removing portions of the intermediate waveguide structure may result in a waveguide structure, as described above.

The methods 800 and 900 may result in a waveguide structure where the layers may be vertically stacked on top of each other such that each layer is horizontal to each other with respect to the width and length of the layers. As described above, the spacer layer may form a slot and the waveguide layers may form rails interfacing the slot.

Figure 10:
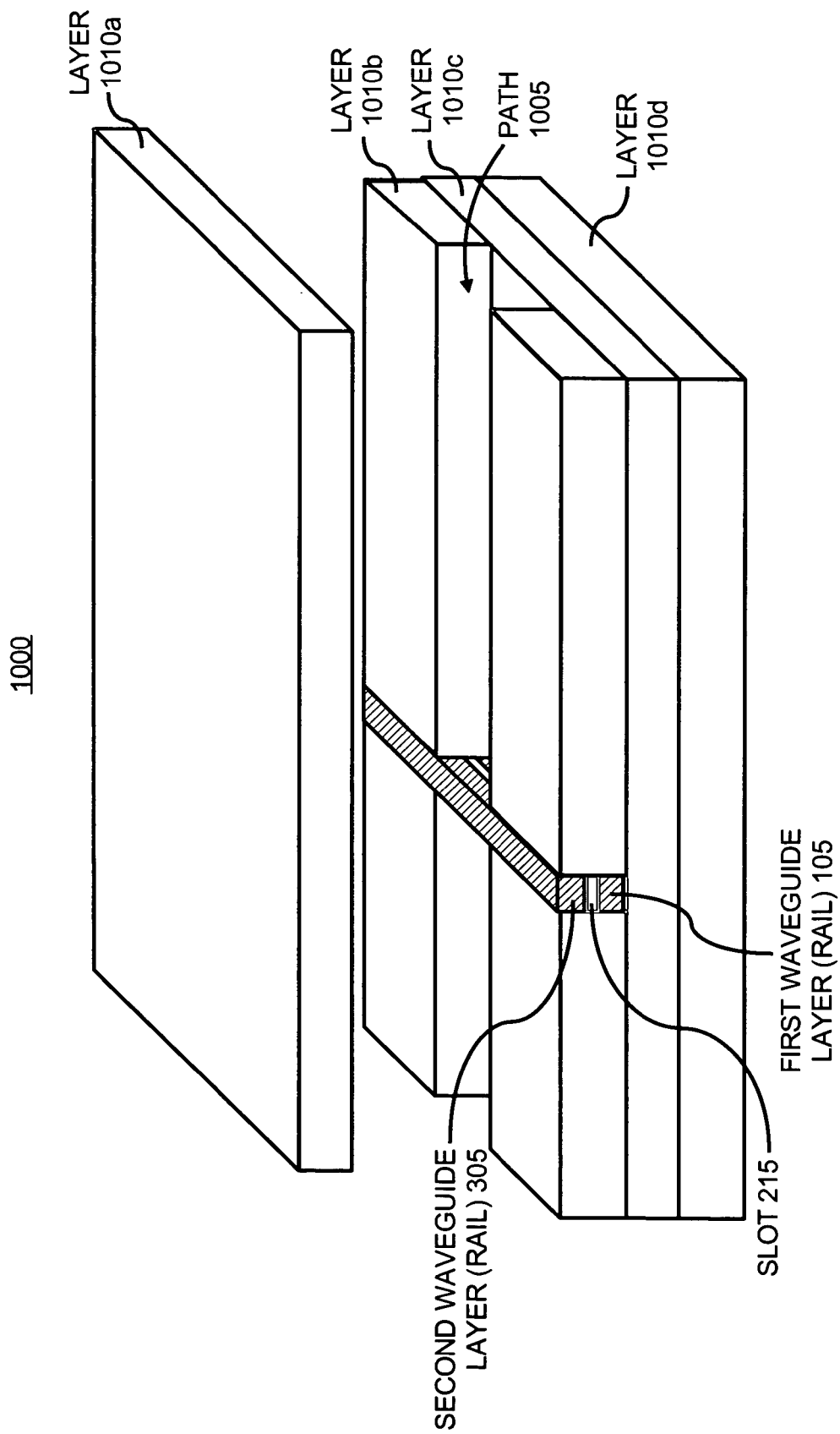
FIG. 10 illustrates a microchannel sensor, according to an embodiment.

FIG. 10 illustrates an exploded view of a microchannel sensor 1000, according to an embodiment where material entering the slot may be detected. The sensor 1000 may include a slot waveguide described above. For example, the microchannel sensor 1000 includes a path 1005 and a slot waveguide structure including the first waveguide layer 105 forming a rail, the slot 215, and the second waveguide layer 305 forming another rail. The slot waveguide structure may intersect the path 1005 at any reasonably suitable angle. The path 1005 may be formed in a multilayer structure having layers 1010$a$-$d$. One of ordinary skill in the art will appreciate that the multilayer structure of the microchannel sensor 1000 may have more than four layers or less than four layers and that the path 1005 may be formed through any of the layers 1010$a$-$d$ or through multiple layers. A material, such as a chemical, biological, biochemical, etc, may be pass through the path 1005 in the multilayer structure to contact the nanometer slot waveguide structure. The material may flow through the slot 215 where it may be detected.

The slot 215 or the portions of the slot 215 where the spacer layer was removed may also be filled with another material. In some applications, it may be desirable to deposit another material into the slot to provide the waveguide structure with different properties. For example, the slot may be filled with a nonlinear optic material, such as nonlinear glass or polymer. The resulting structure may be used for nonlinear optics, such as wavelength conversion, all-optical switching, stimulated Raman/Brillouin scattering, parametric processes (frequency doubling, four-wave-mixing, etc.), etc. In another application, such as laser applications, the slot may be filled with a laser gain medium, such as erbium-doped silica (in a silicon-based structure). In this application, optical pumping may then cause laser emission. In quantum information processing (QIP) applications, for example, the slot may be filled with a QIP medium, in order to experience quantum optical effects. For example, Rb vapor may be used to observe very low power nonlinear effects.

While the embodiments have been described with reference to examples, those skilled in the art will be able to make various modifications to the described embodiments. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A nanometer slot waveguide with vertically stacked layers, wherein the vertically stacked layers comprise:
   a first substrate;
   a first waveguide layer defining a first rail;
   a spacer layer defining a slot; and
   a second waveguide layer defining a second rail, wherein the spacer layer defining a slot is located between the first waveguide layer and the second waveguide layer, and wherein a roughness of surfaces of the first and second rails interfacing the slot have substantially atomically flat surfaces.

2. The nanometer slot waveguide of claim 1, wherein a roughness of surfaces of the first and second rails interfacing the slot varies a width of the slot by less than about 2 nanometers.

3. The nanometer slot waveguide of claim 1, wherein the spacer layer and the second waveguide layer are located on the first waveguide layer.

4. A method of fabricating a nanometer slot waveguide comprising:
   applying a spacer layer to a first waveguide structure, wherein the first waveguide structure includes a first waveguide layer and a first substrate layer, the first waveguide layer having a refractive index greater than the first substrate layer;
   applying a second waveguide structure to the spacer layer to create an intermediate waveguide structure, wherein the second waveguide structure includes a second waveguide layer, the second waveguide layer having a refractive index greater than the second substrate layer; and
   removing portions of the intermediate waveguide structure to create a nanometer slot waveguide structure.

5. The method of claim 4, wherein the first waveguide layer forms a first rail, the second waveguide layer forms a second rail, and the spacer layer forms a slot between the first waveguide layer and the second waveguide layer.

6. The method of claim 5, wherein a width of the slot is less than about 100 nanometers.

7. The method of claim 5, wherein surfaces of the first and second rails interfacing the slot are substantially atomically flat.

8. The method of claim 5, wherein a roughness of surfaces of the first and second rails interfacing the slot varies a width of the slot by less than about 2 nanometers.

9. The method of claim 5, wherein the method further comprises:
   at least partially removing the spacer layer that forms the slot.

10. The method of claim 8, wherein the method further comprises:
    inserting a material into the at least partially removed spacer layer, wherein the material inserted into the at least partially removed spacer layer comprises at least one selected from a nonlinear optic material, a laser gain medium, and a quantum information processing medium.

11. The method of claim 5, wherein the nanometer slot waveguide is operable to detect the presence of a material that has entered the slot.

12. The method of claim 5, wherein the slot is operable to be monitored to detect a change in at least one of a dielectric index or an optical absorption.

13. The method of claim 5, wherein the method further comprises:
    increasing or decreasing a width of the slot by an external means including at least one of temperature, pressure, stress, and vibration.

14. The method of claim 4, wherein the nanometer slot waveguide has microcavities.

15. The method of claim 4, wherein the second waveguide structure includes a second substrate layer and the method further comprises:
    removing the second substrate layer of the second waveguide structure to create the intermediate waveguide structure.

16. A microchannel sensor comprising:
    a microchannel forming a path for the flow of a material; and
    a nanometer slot waveguide intersecting the path formed by the microchannel, wherein the nanometer slot waveguide comprises a first waveguide layer defining a first rail, a second waveguide layer defining a second rail, and a slot between the first and second waveguide layers, wherein the material is operable to flow through the path in the microchannel to contact at least a portion of the nanometer slot waveguide.

17. The microchannel sensor of claim 15, wherein the first and second rails have substantially atomically flat surfaces.

18. The microchannel sensor of claim 15, wherein the material is operable to flow through the path in the microchannel and through the slot.

19. The microchannel sensor of claim 15, wherein a roughness of surfaces of the first and second rails interfacing the slot varies a width of the slot by less than about 2 nanometers.

20. The microchannel sensor of claim 15, wherein a width of the slot is operable to be altered through external means including at least one of thermal, pressure, vibration, electrical, and stress.

* * * * *